(12) United States Patent
Matsumoto

(10) Patent No.: US 9,233,872 B2
(45) Date of Patent: Jan. 12, 2016

(54) GLASS WELDING METHOD AND GLASS LAYER FIXING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 13/511,674

(22) PCT Filed: Sep. 17, 2010

(86) PCT No.: PCT/JP2010/066138
§ 371 (c)(1),
(2), (4) Date: Jun. 13, 2012

(87) PCT Pub. No.: WO2011/065105
PCT Pub. Date: Jun. 3, 2011

(65) Prior Publication Data
US 2012/0240628 A1    Sep. 27, 2012

(30) Foreign Application Priority Data

Nov. 25, 2009    (JP) ................. P2009-267817

(51) Int. Cl.
*B32B 17/10* (2006.01)
*C03C 17/00* (2006.01)
(Continued)

(52) U.S. Cl.
CPC ........... *C03C 17/02* (2013.01); *B32B 17/10036* (2013.01); *C03C 17/04* (2013.01)

(58) Field of Classification Search
CPC ........ C03C 17/00; C03C 23/00; C03C 27/00; C03C 27/06; B32B 17/00; B32B 17/10036; B32B 457/20; C03B 23/203; C03B 23/24; C03B 33/076; C03B 33/09; H01J 2211/48; H01J 2329/8675; H01J 9/241; H01J 9/40; H01J 11/54; H01J 2211/34; H01J 2329/867; H01J 2329/941; H01J 29/86
USPC .................................................. 65/43; 156/99
See application file for complete search history.

(56) References Cited

U.S. PATENT DOCUMENTS 3,453,097 A    7/1969 Hafner
3,663,793 A *  5/1972 Petro et al. ............... 219/121.69
(Continued)

FOREIGN PATENT DOCUMENTS

CN    1329395    1/2002
CN    1738777    2/2006
(Continued)

OTHER PUBLICATIONS

U.S. Office Action dated Jan. 22, 2013 that issued in U.S. Appl. No. 13/345,199 including Double Patenting Rejections on pp. 6-8.
(Continued)

*Primary Examiner* — Jodi C Franklin
(74) *Attorney, Agent, or Firm* — Drinker Biddle & Reath LLP

(57) ABSTRACT

When fixing a glass layer 3 to a glass member 4 by irradiation with laser light employing a one portion 31 of the glass layer 3 as start and end points, the glass layer 3 is cut at the one portion 31. In the glass layer 3, the one portion 31 is made thicker than a main portion 32, whereby end parts 3a, 3b rise fully. Melting the end parts 3a, 3b by irradiation with laser light L2 for a preliminary stage for final firing while pressing them toward the glass member 4 reliably buries a gap G and homogenizes the thickness of the glass layer 3. Thus constructed glass layer 3 is irradiated with the laser light L2 for final firing, so as to fuse the glass members 4, 5 to each other.

6 Claims, 15 Drawing Sheets

(51) Int. Cl.
    *C03C 17/02*        (2006.01)
    *C03C 17/04*        (2006.01)

(56)              References Cited

U.S. PATENT DOCUMENTS

| | | | |
|---|---|---|---|
| 4,343,833 | A | 8/1982 | Sawae et al. |
| 5,489,321 | A | 2/1996 | Tracy et al. |
| 6,565,400 | B1 | 5/2003 | Lee et al. |
| 7,371,143 | B2 * | 5/2008 | Becken et al. ............... 445/25 |
| 7,641,976 | B2 * | 1/2010 | Lamberson et al. .......... 428/428 |
| 7,820,941 | B2 | 10/2010 | Brown et al. |
| 7,834,550 | B2 * | 11/2010 | Lee et al. ...................... 313/512 |
| 7,932,670 | B2 * | 4/2011 | Yoo et al. ...................... 313/505 |
| 8,063,561 | B2 * | 11/2011 | Choi et al. ..................... 313/512 |
| 8,440,479 | B2 * | 5/2013 | Nguyen et al. ................. 438/29 |
| 8,490,434 | B2 * | 7/2013 | Watanabe et al. .............. 65/155 |
| 8,516,852 | B2 * | 8/2013 | Matsumoto et al. ............. 65/36 |
| 2004/0069017 | A1 * | 4/2004 | Li et al. ............................ 65/43 |
| 2004/0207314 | A1 | 10/2004 | Aitken et al. |
| 2005/0103755 | A1 | 5/2005 | Baker et al. |
| 2006/0082298 | A1 | 4/2006 | Becken et al. |
| 2006/0084348 | A1 | 4/2006 | Becken et al. |
| 2007/0007894 | A1 * | 1/2007 | Aitken et al. .................. 313/512 |
| 2007/0053088 | A1 | 3/2007 | Kranz et al. |
| 2007/0128967 | A1 * | 6/2007 | Becken et al. ................. 445/25 |
| 2007/0170845 | A1 * | 7/2007 | Choi et al. ..................... 313/504 |
| 2007/0173167 | A1 * | 7/2007 | Choi ................................. 445/25 |
| 2008/0106194 | A1 | 5/2008 | Logunov et al. |
| 2008/0124558 | A1 | 5/2008 | Boek et al. |
| 2008/0135175 | A1 | 6/2008 | Higuchi |
| 2008/0182062 | A1 * | 7/2008 | Becken et al. ................... 428/68 |
| 2009/0071588 | A1 * | 3/2009 | Kimura et al. ................. 156/64 |
| 2009/0080055 | A1 | 3/2009 | Baur et al. |
| 2009/0086325 | A1 | 4/2009 | Liu et al. |
| 2009/0110882 | A1 | 4/2009 | Higuchi |
| 2009/0142984 | A1 | 6/2009 | Logunov et al. |
| 2009/0297861 | A1 * | 12/2009 | Banks et al. ................... 428/428 |
| 2009/0297862 | A1 * | 12/2009 | Boek et al. ..................... 428/428 |
| 2009/0308105 | A1 | 12/2009 | Pastel et al. |
| 2010/0006228 | A1 * | 1/2010 | Abe et al. ....................... 156/356 |
| 2010/0095705 | A1 * | 4/2010 | Burkhalter et al. ............. 65/61 |
| 2010/0116119 | A1 | 5/2010 | Bayne |
| 2010/0129666 | A1 | 5/2010 | Logunov et al. |
| 2010/0154476 | A1 * | 6/2010 | Becken et al. .................... 65/36 |
| 2010/0267307 | A1 * | 10/2010 | Park et al. ........................ 445/25 |
| 2010/0304513 | A1 | 12/2010 | Nguyen et al. |
| 2011/0001424 | A1 | 1/2011 | Logunov et al. |
| 2011/0061789 | A1 * | 3/2011 | Matsumoto ..................... 156/99 |
| 2011/0067448 | A1 * | 3/2011 | Matsumoto et al. .............. 65/36 |
| 2011/0072855 | A1 * | 3/2011 | Matsumoto et al. .............. 65/36 |
| 2011/0088430 | A1 * | 4/2011 | Matsumoto ....................... 65/43 |
| 2011/0088431 | A1 * | 4/2011 | Matsumoto ....................... 65/43 |
| 2011/0135857 | A1 * | 6/2011 | Logunov et al. ............ 428/34.6 |
| 2011/0169108 | A1 * | 7/2011 | Gardner et al. ............... 257/417 |
| 2011/0223360 | A1 * | 9/2011 | Shibuya et al. ................ 428/34 |
| 2011/0223371 | A1 * | 9/2011 | Kawanami ..................... 428/76 |
| 2011/0256407 | A1 | 10/2011 | Boek et al. |
| 2011/0265518 | A1 * | 11/2011 | Matsumoto et al. .............. 65/43 |
| 2012/0111059 | A1 * | 5/2012 | Watanabe et al. ................ 65/43 |
| 2012/0147538 | A1 * | 6/2012 | Kawanami et al. ...... 361/679.01 |
| 2012/0151965 | A1 * | 6/2012 | Matsumoto et al. .............. 65/43 |
| 2012/0156406 | A1 * | 6/2012 | Banks et al. ................. 428/34.4 |
| 2012/0222450 | A1 * | 9/2012 | Lamberson et al. .............. 65/43 |
| 2012/0234048 | A1 * | 9/2012 | Matsumoto ....................... 65/56 |
| 2012/0240628 | A1 * | 9/2012 | Matsumoto ....................... 65/43 |
| 2012/0240629 | A1 * | 9/2012 | Matsumoto ....................... 65/43 |
| 2012/0240630 | A1 * | 9/2012 | Matsumoto ....................... 65/43 |
| 2012/0240631 | A1 * | 9/2012 | Matsumoto ....................... 65/43 |
| 2012/0240632 | A1 * | 9/2012 | Matsumoto ....................... 65/43 |
| 2012/0240633 | A1 * | 9/2012 | Matsumoto ....................... 65/43 |
| 2012/0247153 | A1 * | 10/2012 | Matsumoto ....................... 65/43 |
| 2012/0260694 | A1 * | 10/2012 | Matsumoto ....................... 65/43 |
| 2012/0285200 | A1 * | 11/2012 | Tanaka ............................. 65/43 |
| 2012/0287026 | A1 | 11/2012 | Masuda |
| 2012/0318023 | A1 * | 12/2012 | Shimomura ..................... 65/43 |
| 2012/0320444 | A1 | 12/2012 | Baur et al. |
| 2013/0011598 | A1 * | 1/2013 | Kawanami et al. ............. 428/76 |
| 2013/0104980 | A1 * | 5/2013 | Sridharan et al. ............. 136/259 |
| 2013/0111953 | A1 * | 5/2013 | Maloney et al. .................. 65/43 |
| 2013/0134396 | A1 * | 5/2013 | Shimomura et al. ............ 257/40 |
| 2013/0174608 | A1 * | 7/2013 | Takeuchi et al. ................ 65/40 |
| 2013/0237115 | A1 | 9/2013 | Choi et al. |
| 2013/0280981 | A1 | 10/2013 | Lee |
| 2013/0314760 | A1 | 11/2013 | Baur et al. |

FOREIGN PATENT DOCUMENTS

| | | | |
|---|---|---|---|
| CN | 1798708 | | 7/2006 |
| CN | 1798710 | | 7/2006 |
| CN | 1836177 | | 9/2006 |
| CN | 101005915 | | 7/2007 |
| CN | 101095247 | | 12/2007 |
| CN | 101103429 | | 1/2008 |
| CN | 101139165 | | 3/2008 |
| CN | 100409392 | C | 8/2008 |
| CN | 101312234 | | 11/2008 |
| CN | 101386477 | | 3/2009 |
| CN | 101434453 | | 5/2009 |
| CN | 101501808 | | 8/2009 |
| CN | 102056858 | | 5/2011 |
| JP | 2-120259 | | 5/1990 |
| JP | 5166462 | | 7/1993 |
| JP | 2000-313630 | | 11/2000 |
| JP | 2002-015108 | | 1/2002 |
| JP | 2002-224871 | | 8/2002 |
| JP | 2002-287107 | | 10/2002 |
| JP | 2002-366050 | | 12/2002 |
| JP | 2002-367514 | | 12/2002 |
| JP | 2002366050 | A * | 12/2002 ................ G09F 9/00 |
| JP | 2004-182567 | | 7/2004 |
| JP | 2005-007665 | | 1/2005 |
| JP | 2005-213125 | | 8/2005 |
| JP | 2006151774 | A * | 6/2006 |
| JP | 2006-524419 | | 10/2006 |
| JP | 2007-90405 | | 4/2007 |
| JP | 2007-264135 | | 10/2007 |
| JP | 2008-115057 | | 5/2008 |
| JP | 2008-115067 | | 5/2008 |
| JP | 2008115057 | A * | 5/2008 |
| JP | 2008-127223 | | 6/2008 |
| JP | 2008-527655 | | 7/2008 |
| JP | 2009-123421 | | 6/2009 |
| JP | 2009-196862 | | 9/2009 |
| KR | 10-0350323 | | 3/2002 |
| KR | 10-2007-0003681 | | 1/2007 |
| KR | 10-2007-0088715 | | 8/2007 |
| TW | I495409 | | 7/2002 |
| TW | 200516064 | | 5/2005 |
| TW | I255934 | | 6/2006 |
| TW | 200733787 | | 9/2007 |
| TW | 200737370 | | 10/2007 |
| TW | 200822789 | | 5/2008 |
| TW | 200911438 | | 3/2009 |
| TW | 200944908 | | 11/2009 |
| WO | WO 2007/067533 | | 6/2007 |
| WO | WO 2007067533 | A2 * | 6/2007 |
| WO | WO 2009/131144 | | 10/2009 |
| WO | WO 2009/150975 | | 12/2009 |
| WO | WO 2009/150976 | | 12/2009 |
| WO | WO 2009/157281 | | 12/2009 |
| WO | WO 2009-157282 | | 12/2009 |

OTHER PUBLICATIONS

JP 20022366050 (Human Translation), retrieved from USPTO Translation Services and attached to the U.S. Office Action dated Apr. 25, 2013 in U.S. Appl. No. 12/994,539.

JP 2008115057 (Human Translation), retrieved from USPTO Translation Services and attached to the U.S. Office Action dated Apr. 25, 2013 in U.S. Appl. No. 12/994,539.

U.S. Office Action dated Apr. 25, 2013 that issued in U.S. Appl. No. 12/994,539 including Double Patenting Rejections on pp. 5-8.

(56) References Cited

OTHER PUBLICATIONS

JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 Including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
U.S. Office Action dated Apr. 25, 2014 that issued in U.S. Appl. No. 13/511,721 including Double Patenting Rejections on pp. 2-3.
U.S. Office Action dated Jun. 3, 2014 that issued in U.S. Appl. No. 13/511,683 including Double Patenting Rejections on pp. 5-11.
U.S. Office Action dated Jul. 2, 2014 that issued in U.S. Appl. No. 13/511,754 including Double Patenting Rejections on pp. 5-8.
U.S. Office Action dated Jan. 16, 2014 that issued in U.S. Appl. No. 13/511,735 including Double Patenting Rejections on pp. 4-8.
U.S. Office Action dated Jan. 28, 2014 that issued in U.S. Appl. No. 13/511,688 including Double Patenting Rejections on pp. 4-8.
U.S. Office Action dated Jul. 1, 2014 that issued in U.S. Appl. No. 13/511,738 including Double Patenting Rejections on pp. 4-5.
U.S. Office Action dated Jul. 31, 2014 that issued in U.S. Appl. No. 12/994,354 including Double Patenting Rejections on pp. 7-10.
U.S. Office Action dated Jan. 22, 2014 that issued in U.S. Appl. No. 13/509,112 including Double Patenting Rejections on pp. 4-5.
U.S. Office Action dated Jul. 1, 2014 that issued in U.S. Appl. No. 13/511,747 including Double Patenting Rejections on pp. 4-5.
U.S. Office Action dated Feb. 24, 2015 that issued in U.S. Appl. No. 13/345,199 including Double Patenting Rejections on pp. 4-14.

* cited by examiner (a)

(b)

GLASS WELDING METHOD AND GLASS LAYER FIXING METHOD

TECHNICAL FIELD

The present invention relates to a glass fusing method which manufactures a glass fusing structure by fusing glass members together and a glass layer fixing method therefor.

BACKGROUND ART

Known as a conventional glass fusing method in the above-mentioned technical field is a method which burns a glass layer containing organic matters (organic solvents and binders), a laser-light-absorbing material, and a glass powder onto one glass member along a region to be fused, then superposes the other glass member on the one glass member with the glass layer interposed therebetween, and irradiates the glass layer with laser light along the region to be fused, so as to fuse the glass members to each other (see, for example, Patent Literature 1).

Meanwhile, for fixing the glass layer to a glass member, techniques for removing the organic matters from the glass layer by irradiation with laser light instead of heating in a furnace have been proposed (see, for example, Patent Literatures 2 and 3). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Translated International Application Laid-Open No. 2008-527655
Patent Literature 2: Japanese Patent Application Laid-Open No. 2002-366050
Patent Literature 3: Japanese Patent Application Laid-Open No. 2002-367514

SUMMARY OF INVENTION

Technical Problem

However, there has been a case where fixing a glass layer to a glass member by irradiation with laser light (so-called temporary firing) and then fusing glass members to each other with the glass layer interposed therebetween by irradiation with laser light (so-called final firing) causes a leak in the glass layer, thus failing to yield a glass fusing structure which requires hermetic fusing.

In view of such circumstances, it is an object of the present invention to provide a glass fusing method which can manufacture a glass fusing structure which requires hermetic fusing, and a glass layer fixing method therefor.

Solution to Problem

For achieving the above-mentioned object, the inventor conducted diligent studies and, as a result, has found out that the leak in the glass layer in the glass fusing structure occurs because there is a case where the glass layer arranged along the region to be fused extending like a closed ring is severed when fixed to the glass member by irradiation with the laser light. That is, as illustrated in FIG. 9, when irradiating a glass layer 3 with the laser light while relatively moving an irradiation region of the laser light along a region to be fused R with a predetermined position P in the glass layer 3 acting as start and end points in order to fix the glass layer to the glass member by melting the glass powder, the glass layer 3 is severed in the vicinity of the predetermined position P as the case may be. This seems to be because of the fact that, when the irradiation region of the laser light returns to the predetermined position P, a melt termination end part 3b of the glass layer 3 which shrinks upon melting of the glass powder is harder to connect with a melt starting end part 3a of the glass layer 3 which has already solidified.

Consequently, as illustrated in FIGS. 10 and 11, the melt termination end part 3b of the glass layer 3 rises and blocks a glass member 5, to which a glass member 4 is to be fused, from coming into uniform contact with the glass layer 3 when superposing the glass member 5 on the glass member 4 with the glass layer 3 interposed therebetween. When fusing the glass members 4, 5 to each other by irradiation with laser light in this state, uniform and hermetic fusing is very hard to achieve. In an example of sizes concerning the glass layer 3 in the state of FIGS. 8 to 10, the width and thickness of the glass layer 3 are about 1.0 mm and about 10 μm, respectively, the height of the melt termination end part 3b is about 20 μm, and the cut width of the glass layer 3 (i.e., the gap between the melt starting end part 3a and melt termination end part 3b) is about 40 μm.

FIG. 12 is a picture representing a photograph of a plane including the melt starting end part and melt termination end part of the glass layer fixed to the glass member. As illustrated in the picture, the glass layer 3 is severed between the melt starting end part 3a and melt termination end part 3b. Here, the width of the melt starting end part 3a gradually increases from its center portion because of the following reason.

That is, in the glass layer arranged on the glass member, scattering of light exceeding the absorption characteristic of the laser-light-absorbing material occurs because of the particle property of the glass powder and the like, so as to place it into a lower laser light absorptance state (e.g., it looks whiter under visible light). When the glass layer is irradiated with laser light in such a state in order to be burned onto the glass member, the glass powder loses its particle property upon melting and so forth, so that the absorption characteristic of the laser-light-absorbing material appears remarkably, whereby the laser light absorptance of the glass layer rises drastically (e.g., it looks darker or greener under visible light). Hence, as illustrated in FIG. 13, the laser light absorptance of the glass layer drastically increases when the temperature of the glass layer exceeds its melting point Tm at the time of fixing the glass layer.

Here, as illustrated in FIG. 14, it is typical for laser light to have such a temperature distribution that the temperature is higher in a center part in its width direction (a direction substantially orthogonal to the advancing direction of the laser light). Therefore, when the laser light is advanced after staying at the irradiation start position for a while in order to yield a stable region in which the glass layer melts in the whole width thereof from the irradiation start position, the melting initially starting at the center part in the width direction may enhance the laser light absorptance at the center part, so as to place the center part into an excess heat input state, thereby generating cracks in the glass member or crystallizing the glass layer.

Advancing the laser light when the glass layer is not molten in the whole width at the irradiation start position for the laser light as illustrated in FIG. 15 in view of the above makes a region extending from the irradiation start position to the stable region become an unstable region in which the width of melting gradually increases from its center portion. The width of the melt starting end part 3a gradually increases from the center portion in FIG. 12 because of the foregoing.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a laser-light-absorbing material and a glass powder on the first glass member along a region to be fused extending like a closed ring so that a one portion of the glass layer has a volume per unit length greater than that of a main portion of the glass layer excluding the one portion; irradiating the glass layer with first laser light while relatively moving an irradiation region of the first laser light along the region to be fused and employing the one portion or one or the other end of the main portion connected to the one portion as start and end points, so as to melt the glass layer, thereby fixing the glass layer to the first glass member; irradiating the part employed as the start and end points in the glass layer with second laser light while pressing the part toward the first glass member, so as to melt the part; and irradiating the glass layer with third laser light in a state where the second glass member is superposed on the first glass member having the glass layer fixed thereto with the glass layer interposed therebetween, so as to fuse the first and second glass members to each other.

The glass layer fixing method in accordance with the present invention is a glass layer fixing method for manufacturing a glass-layer-fixed member by fixing a glass layer to a first glass member, the method comprising the steps of arranging a glass layer containing a laser-light-absorbing material and a glass powder on the first glass member along a region to be fused extending like a closed ring so that a one portion of the glass layer has a volume per unit length greater than that of a main portion of the glass layer excluding the one portion; and irradiating the glass layer with first laser light while relatively moving an irradiation region of the first laser light along the region to be fused and employing the one portion or one or the other end of the main portion connected to the one portion as start and end points, so as to melt the glass layer, thereby fixing the glass layer to the first glass member.

In the glass fusing method and glass layer fixing method, when fixing the glass layer to the first glass member by irradiation with the first laser light, the glass layer is cut or likely to cut at a position employed as start and end points of the irradiation with the first laser light (i.e., a one portion of the glass layer or one or the other end of a main portion of the glass layer connected to the one portion). Since the one portion of the main portion has a volume per unit length greater than that of the main portion excluding the one portion in the glass layer here, the part employed as the start and end points of the irradiation with the first laser light rises fully. Irradiating this part with second laser light in this state while pressing the part toward the first glass member, so as to melt the part, can reliably bury regions which are cut or likely to cut, while the thickness is homogenized throughout the glass layer. Irradiating such a glass layer with third laser light in a state where the second glass member is superposed on the first glass member with the glass layer interposed therebetween, so as to fuse the first and second glass members to each other, can prevent leaks from occurring in the glass layer, thereby making it possible to manufacture a glass fusing structure which requires hermetic fusing.

Preferably, in the glass fusing method in accordance with the present invention, the one portion of the glass layer has a thickness greater than that of the main portion of the glass layer. Alternatively, it will be preferred if the one portion of the glass layer has a width greater than that of the main portion of the glass layer. These can reliably yield a glass layer in which the one portion has a volume per unit length greater than that of the main portion excluding the one portion.

Preferably, in the glass fusing method in accordance with the present invention, the part employed as the start and end points is molten by irradiation with the third laser light used as the second laser light while being pressed toward the first glass member by the second glass member superposed on the first glass member having the glass layer fixed thereto with the glass layer interposed therebetween, and then the glass layer is irradiated with the third laser light, so as to fuse the first and second glass members to each other. In this case, the pressing/melting step for the part employed as the start and end points of the irradiation with the first laser light can be performed easily and reliably.

Preferably, in the glass fusing method in accordance with the present invention, the part employed as the start and end points is irradiated with the second laser light while being included in an irradiation region. This can melt the part employed as the start and end points of the irradiation with the first laser light reliably at once.

Advantageous Effects of Invention

The present invention can manufacture a glass fusing structure which requires hermetic fusing.

DESCRIPTION OF EMBODIMENTS

Figure 1:
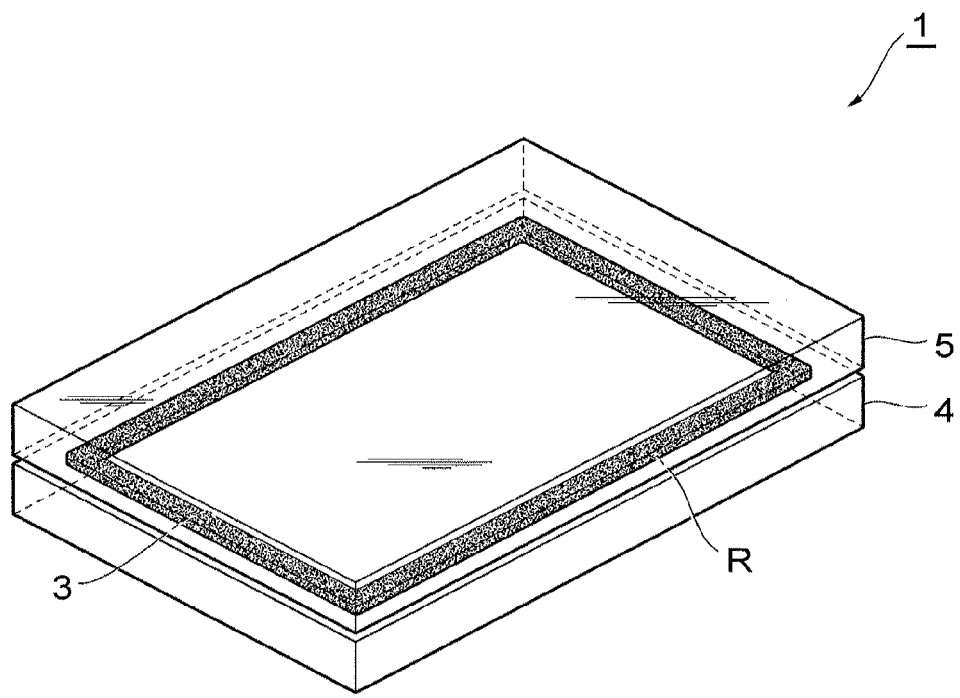
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
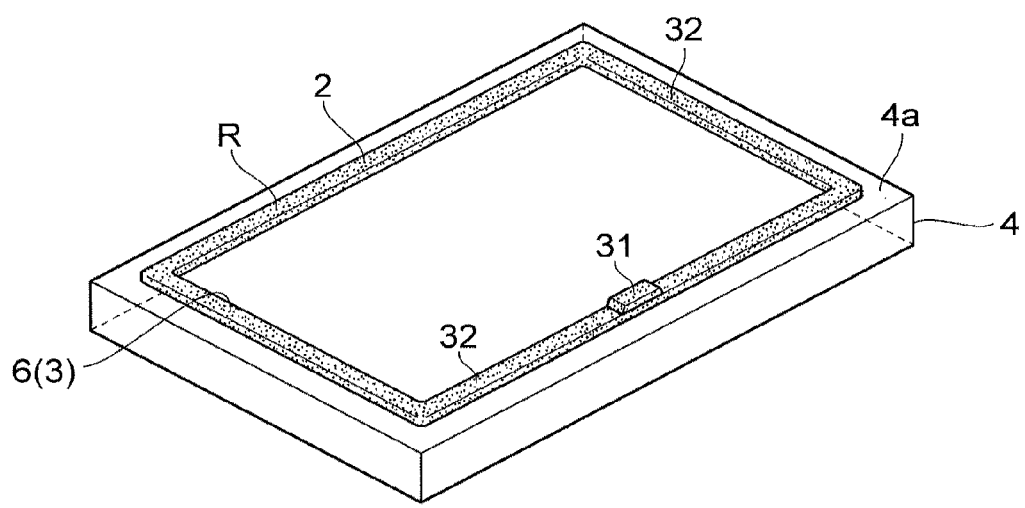
FIG. 2 is a perspective view for explaining the glass fusing method for manufacturing the glass fusing structure of FIG. 1.

First, as illustrated in FIG. 2, a fit paste is applied by a dispenser, screen printing, or the like, so as to form a paste layer 6 on a surface 4a of the glass member 4 along the region to be fused R. An example of the frit paste is one in which a powdery glass fit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (acrylic or the like) thermally decomposable at the melting point temperature of the glass or lower are kneaded. That is, the paste layer 6 contains the organic solvent, binder, laser-light-absorbing pigment, and glass fit 2.

Subsequently, the paste layer 6 is dried, so as to remove the organic solvent. As a consequence, the glass layer 3 containing the binder, laser-light-absorbing pigment, and glass frit 2 is arranged on the glass member 4 along the region to be fused R extending like a closed rectangular ring. Scattering of light exceeding the absorption characteristic of the laser-light-absorbing pigment occurs because of the particle property of the glass frit 2 and the like in the glass layer 3 arranged on the surface 4a of the glass member 4, thereby placing it into a lower laser light absorptance state (e.g., the glass layer 3 looks whiter under visible light).

Figure 3:
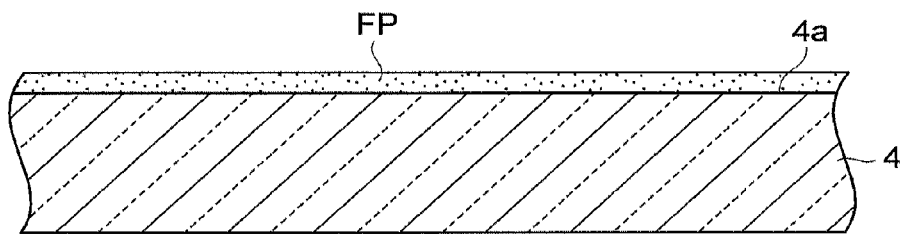
FIG. 3 is a set of sectional views for explaining the glass fusing method for manufacturing the glass fusing structure of FIG. 1.
Figure 3:
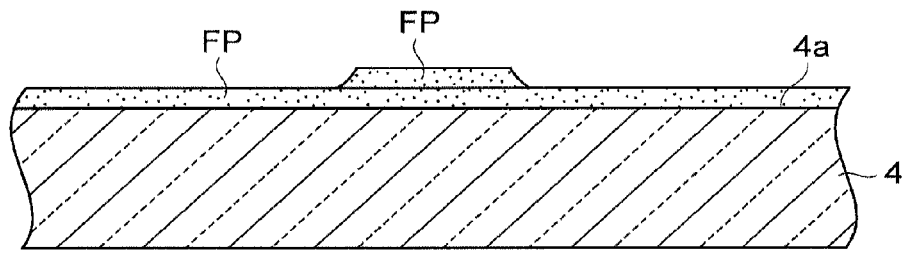

Here, the glass layer 3 is formed by applying one layer of a fit paste FP to the whole periphery of the region to be fused R as illustrated in FIG. 3(a) and then another layer of the frit paste FP to a predetermined part on a linear portion of the region to be fused R as illustrated in FIG. 3(b). Therefore, as illustrated in FIG. 2, a one portion 31 of the glass layer 3 has a thickness greater than that of a main portion 32 of the glass layer 3 excluding the one portion 31. That is, in the glass layer 3 arranged on the glass member 4, the one portion 31 has a volume per unit length greater than that of the main portion 32.

Figure 4:
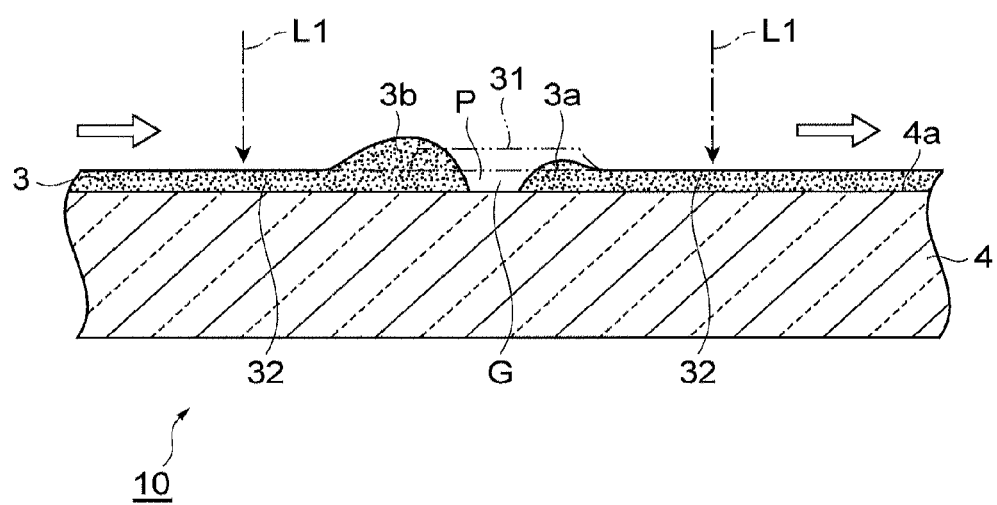
FIG. 4 is a sectional view for explaining the glass fusing method for manufacturing the glass fusing structure of FIG. 1.

Next, as illustrated in FIG. 4, the glass layer 3 is irradiated with laser light (first laser light) L1 while employing a predetermined position within the one portion 31 of the glass layer 3 as start and end points and relatively moving an irradiation region of the laser light L1 along the region to be fused R. The irradiation with the laser light L1 gasifies the binder and melts the glass frit 2, so as to fix the glass layer 3 to the glass member 4 (temporary firing), thereby yielding a glass-layer-fixed member 10. The glass frit 2 loses its particle property upon melting and so forth, so that the absorption characteristic of the laser-light-absorbing pigment appears remarkably in the glass layer 3, whereby the glass layer 3 attains a laser light absorptance higher than that of the glass frit 2 before melting (e.g., the glass layer 3 looks darker or greener under visible light).

At that time, the glass layer 3 is cut near the predetermined position P, so that the one portion 31 of the glass layer 3 is separated into a melt starting end part 3a and a melt termination end part 3b. This seems to be because of the fact that, when the irradiation region of the laser light L1 returns to the predetermined position P, the melt termination end part 3b of the glass layer 3 that shrinks upon melting of the glass fit 2 is harder to connect with the already solidified melt starting end part 3a of the glass layer 3. Since the one portion 31 of the glass layer 3 has a volume per unit length greater than that of the main portion 32 of the glass layer 3, the melt starting end part 3a and melt termination end part 3b rise more than in the case without such a volume difference, thereby projecting greatly from the main portion 32 of the glass layer 3 to the side opposite from the glass member 4. In an example of sizes concerning the glass layer 3, the width and thickness of the glass layer 3 are about 1.0 mm and about 10 μm, respectively, the height of the melt termination end part 3b is about 60 μm, and the cut width of the glass layer 3 (i.e., the gap between the melt starting end part 3a and melt termination end part 3b) is about 40 μm. The melt starting end part 3a and melt termination end part 3b of the glass layer 3 oppose each other through a gap G of the glass layer 3 in a linear portion of the region to be fused R.

Figure 5:
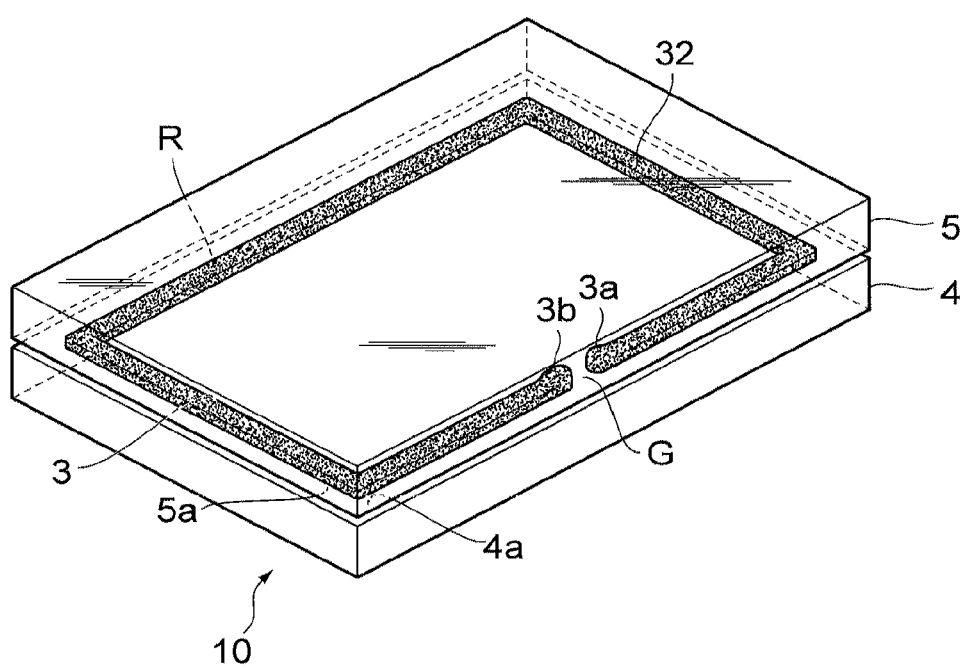
FIG. 5 is a perspective view for explaining the glass fusing method for manufacturing the glass fusing structure of FIG. 1.
Figure 6:
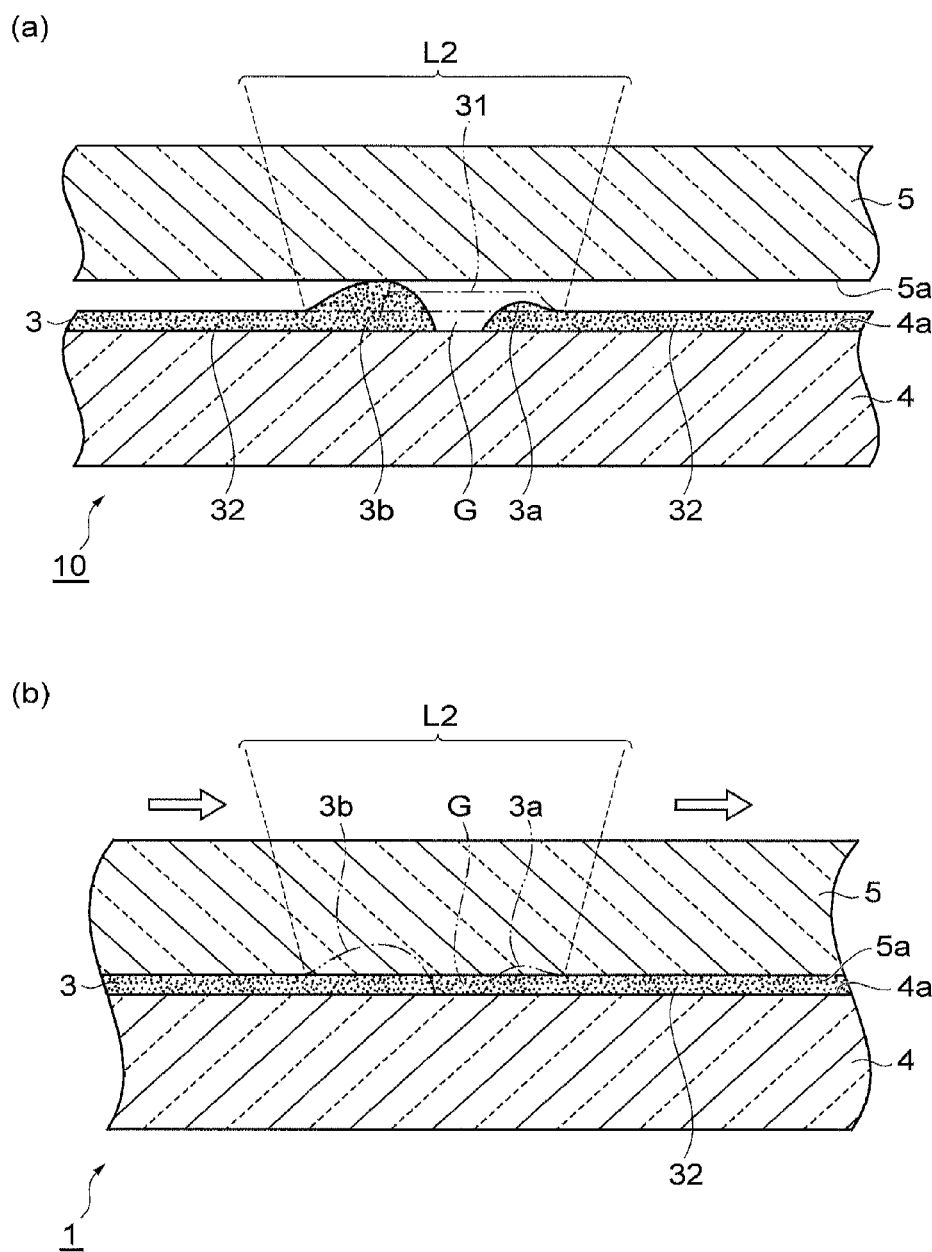
FIG. 6 is a set of sectional views for explaining the glass fusing method for manufacturing the glass fusing structure of FIG. 1.

Subsequently, as illustrated in FIG. 5, the glass member 5 is superposed on the glass-layer-fixed member 10 (i.e., the glass member 4 having the main portion 32 of the glass layer 3 fixed thereto) with the glass layer 3 interposed therebetween. Then, as illustrated in FIG. 6(a), the melt starting end part 3a and melt termination end part 3b (parts employed as the start and end points of the irradiation with the laser light L1) are irradiated with laser light (second laser light or third laser light) L2 while being pressed toward the glass member 4 by the glass member 5. The laser light L2 irradiates the melt starting end part 3a and melt termination end part 3b while being stopped in a state where its irradiation region includes the melt starting end part 3a and melt termination end part 3b. In an example of irradiation conditions at this time, the laser light L2 has a spot diameter of 1.6 mm, a moving speed of 0 mm/sec, and a power of 6 W. For preventing the glass members 4, 5 from being heated in excess at the gap G, the irradiation region of the laser light L2 may have a ring shape or twin spots corresponding to the melt starting end part 3a and melt termination end part 3b, respectively.

The irradiation with the laser light L2 melts the melt starting end part 3a and melt termination end part 3b, so as to bury the gap G of the glass layer 3 as illustrated in FIG. 6(b). Here, the unmolten main portion 32 of the glass layer 3 stops the glass member 5 from sinking, so that the glass layer 3 homogenizes its thickness, whereby the glass member 5 comes into uniform contact with the glass layer 3 homogenized in a high laser light absorptance state.

Subsequently, the glass layer 3 is irradiated with the laser light L2 along the region to be fused R under a switched irradiation condition. That is, the glass layer 3 is irradiated with the laser light L2 while the irradiation region of the laser light L2 is relatively moved along the region to be fused R. This lets the glass layer 3 and its peripheral parts (the parts of surfaces 4a, 5a of the glass members 4, 5) melt and re-solidify, thereby bonding the glass members 4, 5 to each other along the region to be fused R (final firing), thus yielding the glass fusing structure 1 (there is also a case where not the glass members 4, 5 but the glass layer 3 melts in fusing). In an example of irradiation conditions at this time, the laser light L2 has a spot diameter of 1.6 mm, a moving speed of 10 mm/sec, and a power of 40 W.

In the glass fusing method (including the glass layer fixing method) for manufacturing the glass fusing structure 1, as explained in the foregoing, the glass layer is cut (which also includes a case where it is likely to cut) at the position employed as the start and end points of irradiation with the laser light L1 for temporary firing when fixing the glass layer 3 to the glass member 4 by the irradiation with the laser light L1. In the glass layer 3, the one portion 31 has a volume per unit length greater than that in the main portion 32, whereby the melt starting end part 3a and melt termination end part 3b rise fully. Melting the melt starting end part 3a and melt termination end part 3b by irradiation with the laser light L2 in a preliminary stage for final firing while pressing the melt starting end part 3a and melt termination end part 3b toward the glass member 4 in this state reliably buries the region cut in the glass layer 3 (i.e., the gap G) and homogenizes the thickness throughout the glass layer 3. Fusing the glass members 4, 5 to each other by irradiating the glass layer 3 with the laser light L for final firing in the state where the glass member 5 is superposed on the glass member 4 with the glass layer 3 interposed therebetween can prevent leaks from occurring in the glass layer 3, thereby making it possible to manufacture the glass fusing structure 1 requiring hermetic fusing.

Making the glass layer as a whole have a volume per unit length greater than usual is not realistic. This is because fusing glass members to each other with such a glass layer interposed therebetween increases the residual stress, thereby making it easier to damage the glass fusing structure.

When arranging the glass layer 3 on the glass member 4, the one portion 31 of the glass layer 3 is made thicker than the main portion 32 of the glass layer 3. This can reliably yield the glass layer 3 in which the one portion 31 has a volume per unit length greater than that of the main portion 32. This can also restrain the glass layer 3 from protruding in the width direction thereof, whereby an effective region surrounded by the glass layer 3 in the glass fusing structure 1 can be made wider.

Figure 7:
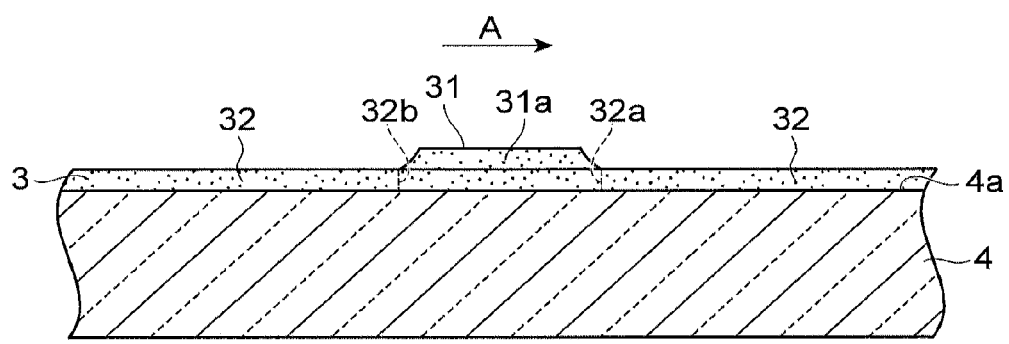
FIG. 7 is a sectional view for explaining the glass fusing method for manufacturing the glass fusing structure of FIG. 1.

When moving the laser light L1 for temporary firing in the direction of arrow A as illustrated in FIG. 7, the predetermined position P employed as the start and end points of irradiation with the laser light L1 may be located not only within the one portion 31 (preferably at its center portion 31a) of the glass layer 3 but also at one end 32a or the other end 32b of the main portion 32 of the glass layer 3 connected to the one portion 31 of the glass layer 3. When the irradiation region of the laser light L1 returns to the predetermined position P, however, the melt termination end part 3b of the glass layer 3 shrinks such as to retract from the already solidified melt starting end part 3a of the glass layer 3, whereby one end 32a of the main portion 32 on the front side in the advancing direction of the laser light L1 (i.e., the direction of arrow A) is preferred over the other end 32b of the main portion 32.

The melt starting end part 3a and melt termination end part 3b are molten by irradiation with the laser light L2 in the preliminary stage for final firing while being pressed toward the glass member 4 by the glass member 5 superposed on the glass member 4 with the glass layer 3 interposed therebetween, and then the glass layer 3 is irradiated with the laser light L2 for final firing, so as to fuse the glass members 4, to each other. This can easily and reliably perform the pressing/melting step for the parts (i.e., the melt starting end part 3a and melt termination end part 3b) employed as the start and end points of the irradiation with the laser light L1 for temporary firing.

The laser light L2 in the preliminary stage for final firing irradiates the melt starting end part 3a and melt termination end part 3b while being stopped in a state where its irradiation region includes the melt starting end part 3a and melt termination end part 3b. As a consequence, the parts (i.e., the melt starting end part 3a and melt termination end part 3b) employed as the start and end points of irradiation with the laser light L1 for temporary firing can be molten reliably at once.

Figure 8:
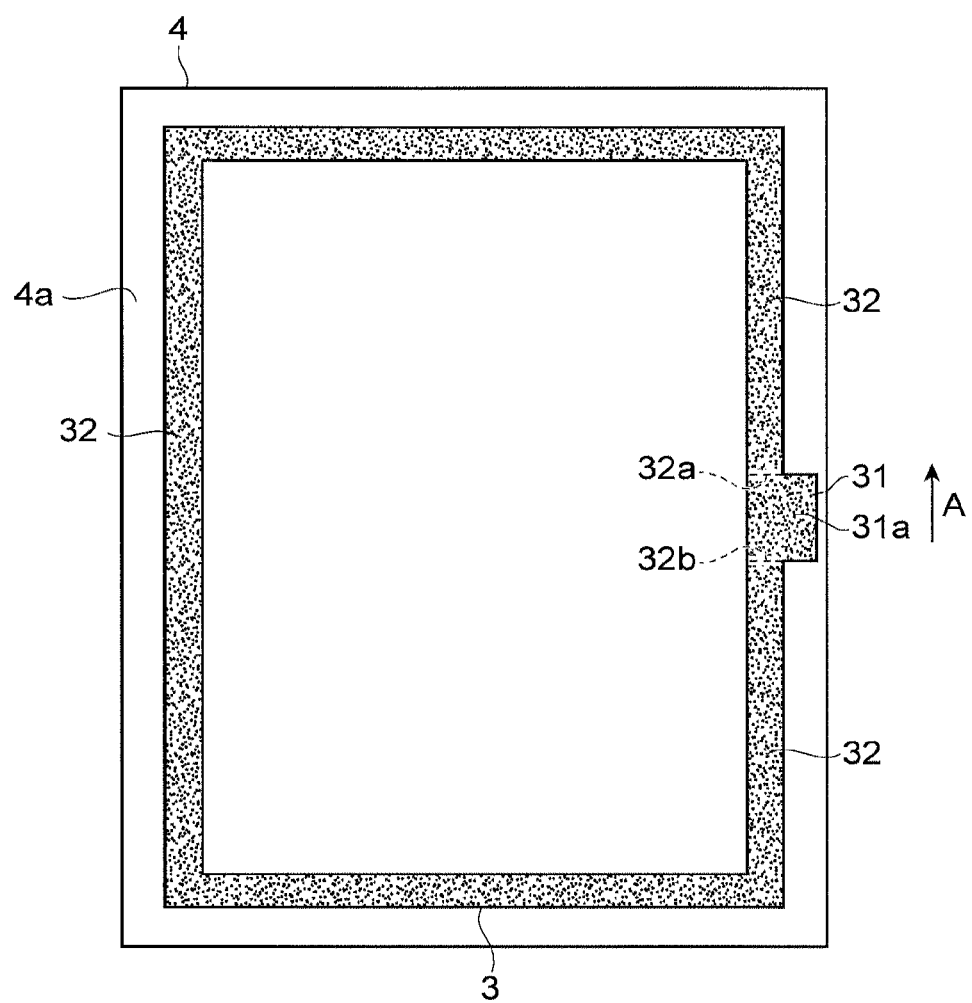
FIG. 8 is a plan view for explaining the glass fusing method for manufacturing the glass fusing structure of FIG. 1.
Figure 9:
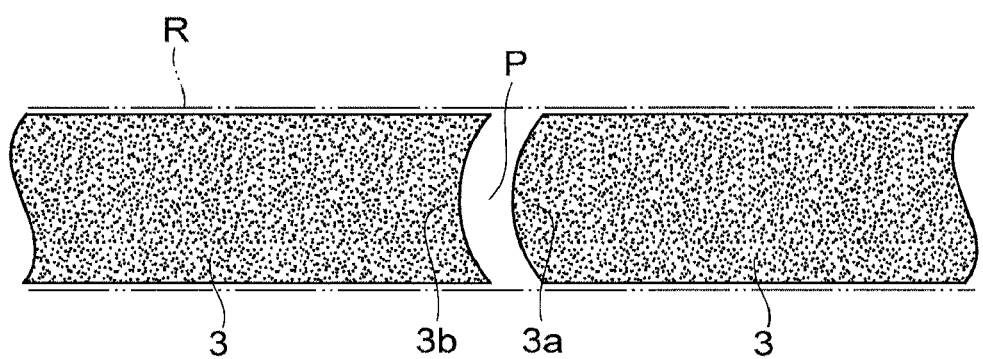
FIG. 9 is a plan view of melt starting and termination end parts of a glass layer fixed to a glass member.
Figure 10:
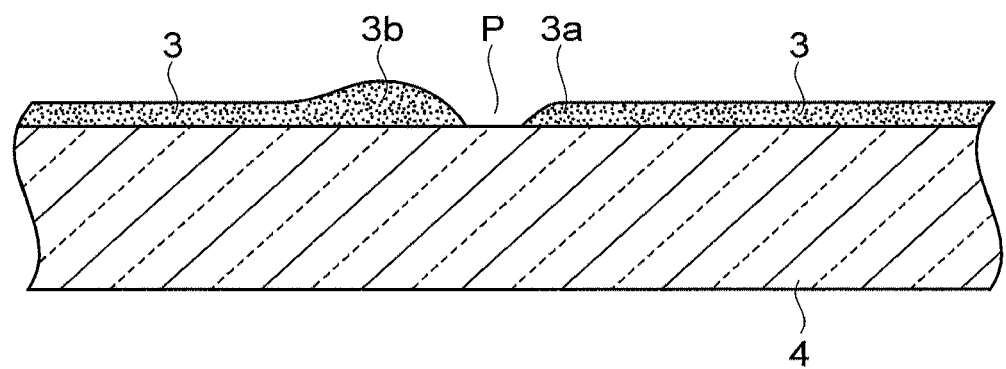
FIG. 10 is a sectional view of the melt starting and termination end parts of the glass layer fixed to the glass member.
Figure 11:
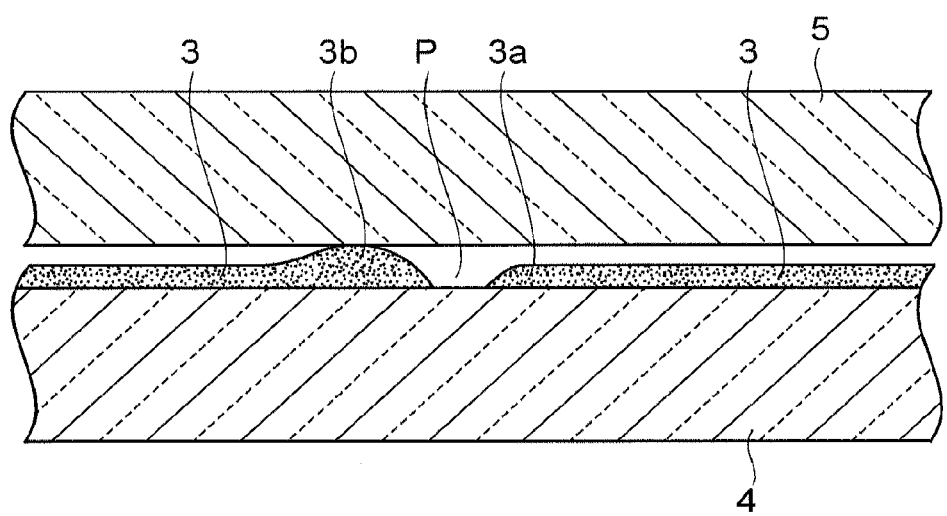
FIG. 11 is a sectional view of the melt starting and termination end parts of the glass layer fixed to the glass member.
Figure 12:
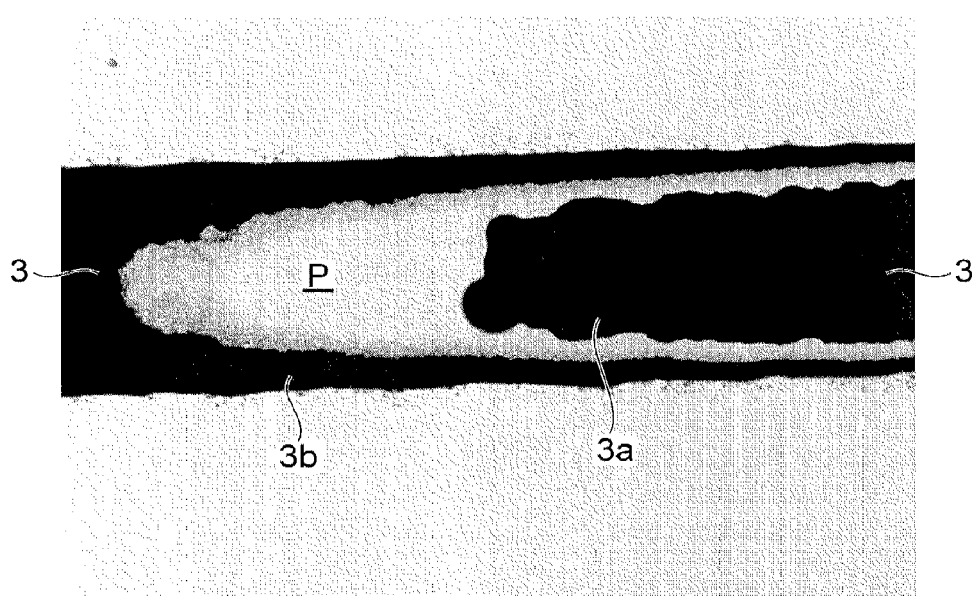
FIG. 12 is a picture representing a photograph of a plane including the melt starting and termination end parts of the glass layer fixed to the glass member.
Figure 13:
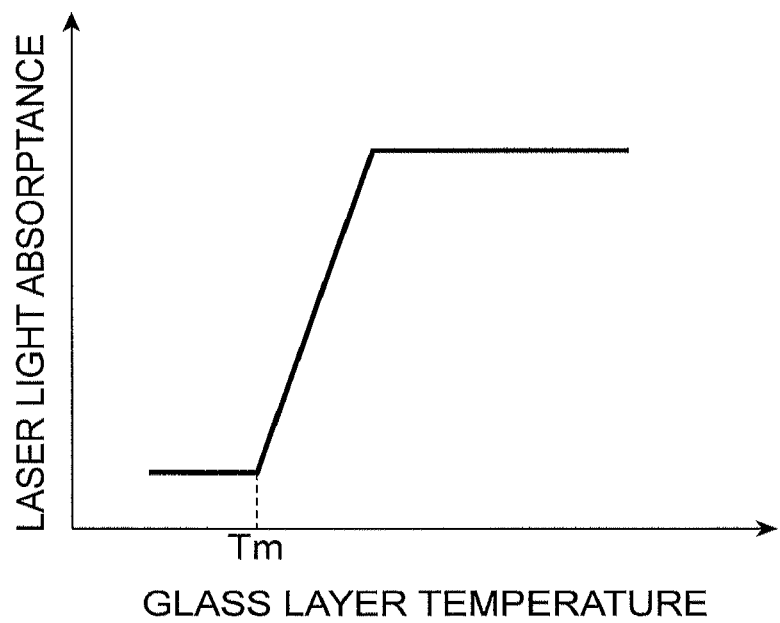
FIG. 13 is a graph illustrating the relationship between the temperature and laser light absorptance of the glass layer.
Figure 14:
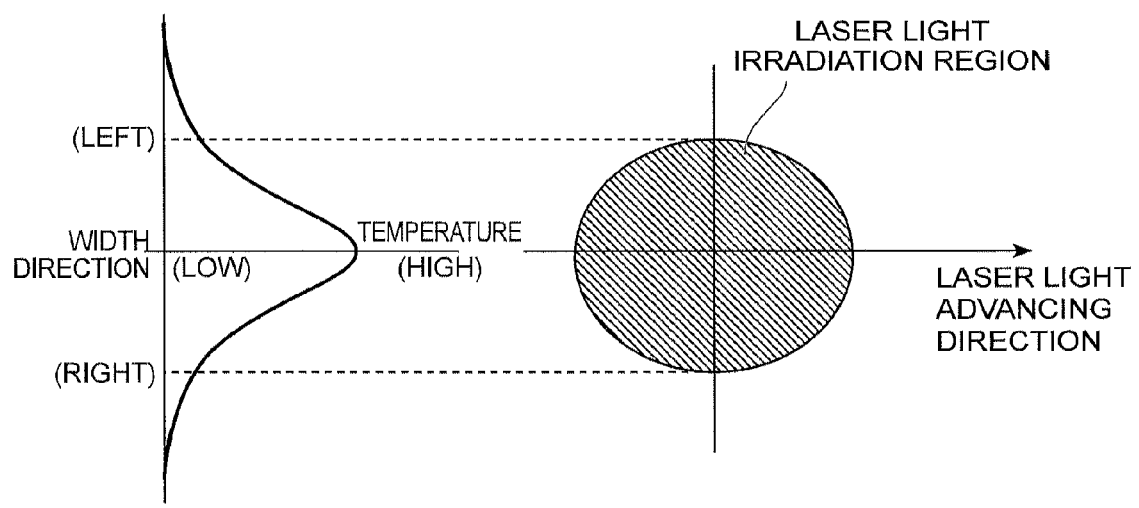
FIG. 14 is a chart illustrating a temperature distribution in laser irradiation.
Figure 15:
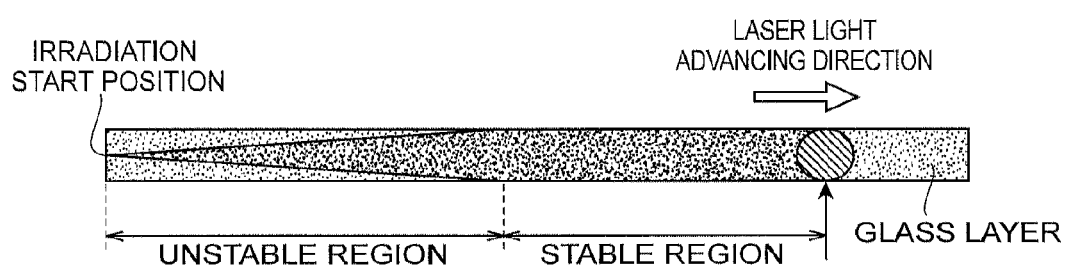
FIG. 15 is a diagram illustrating stable and unstable regions in laser irradiation.

The present invention is not limited to the above-mentioned embodiment. For example, when arranging the glass layer 3 on the glass member 4, the one portion 31 of the glass layer 3 may have a width greater than that of the main portion 32 of the glass layer 3 as illustrated in FIG. 8. This can reliably yield the glass layer 3 in which the one portion 31 has a volume per unit length greater than that of the main portion 32. This can also easily finish arranging the glass layer 3 on the glass member 4, since the frit paste is required to be applied only once.

When moving the laser light L1 for temporary firing in the direction of arrow A as illustrated in FIG. 8, the predetermined position P employed as the start and end points of irradiation with the laser light L1 may be located not only within the one portion 31 (preferably at its center portion 31a) of the glass layer 3 but also at one end 32a or the other end 32b of the main portion 32 of the glass layer 3 connected to the one portion 31 of the glass layer 3. When the irradiation region of the laser light L1 returns to the predetermined position P, however, the melt termination end part 3b of the glass layer 3 shrinks such as to retract from the already solidified melt starting end part 3a of the glass layer 3, whereby one end 32a of the main portion 32 on the front side in the advancing direction of the laser light L1 (i.e., the direction of arrow A) is preferred over the other end 32b of the main portion 32. The irradiation region of the laser light L2 for the preliminary stage for final firing at this time is required to be made greater so as to match the one portion 31 of the glass layer 3, which makes it necessary to mask both sides of the glass layer 3 or reduce the irradiation region when subsequently irradiating the main portion 32 of the glass layer 3 with the laser light L2 for final firing.

The parts (i.e., the melt starting end part 3a and melt termination end part 3b) employed as the start and end points of irradiation with the laser light L1 for temporary firing in the glass layer 3 may be molten by irradiation with laser light while being pressed toward the glass member 4 by a sheet-shaped member (e.g., a light-transmitting member in place of the glass member 5). When the pressing and melting of the melt starting end part 3a and melt termination end part 3b is completed, the sheet-shaped member is peeled off, so as to yield the glass-layer-fixed member 10. In this case, the laser light L2 for final firing starts irradiating the glass layer 3 from a part other than the parts employed as the start and end points of irradiation with the laser light L1 and terminates it after an overlap.

Irradiation with the laser light L2 for final firing may be performed at once for the whole glass layer 3 without being restricted to the one relatively moving its irradiation region along the region to be fused R. The glass layer 3 to be irradiated with the laser light L1 for temporary firing may be one corresponding to the paste layer 6 containing the organic solvent, binder, laser-light-absorbing pigment, and glass fit 2, or one containing the organic solvent and glass fit 2 by removing the organic solvent and binder from the paste layer 6 and so forth. The glass fit 2 may have a melting point on a par with or higher than that of the glass members 4, 5 instead of the one lower than that. The laser-light-absorbing pigment may be contained in the glass frit 2 itself. The region to be fused R is not limited to the rectangular ring shape, but may be formed into a circular ring or the like as long as it extends like a closed ring.

INDUSTRIAL APPLICABILITY

The present invention can manufacture a glass fusing structure which requires hermetic fusing.

REFERENCE SIGNS LIST

1 . . . glass fusing structure; 2 . . . glass fit (glass powder); 3 . . . glass layer; 4 . . . glass member (first glass member); 5 . . . glass member (second glass member); 10 . . . glass-layer-fixed member; 31 . . . one portion; 32 . . . main portion; 32a . . . one end; 32b . . . other end; L1 . . . laser light (first laser light); L2 . . . laser light (second laser light and third laser light); R . . . region to be fused

The invention claimed is:

1. A glass fusing method for manufacturing a glass fusing structure by fusing first and second glass members to each other, the method comprising the steps of:
    arranging a glass layer containing a laser-light-absorbing material and a glass powder on the first glass member along a region to be fused extending like a closed ring so that a one portion of the glass layer has a volume per unit length greater than that of a main portion of the glass layer excluding the one portion;
    irradiating the glass layer with first laser light while relatively moving an irradiation region of the first laser light along the region to be fused and employing the one portion or one or the other end of the main portion connected to the one portion as start and end points, so as to melt the glass layer, thereby fixing the glass layer to the first glass member;
    irradiating the part employed as the start and end points in the glass layer with second laser light while pressing the part toward the first glass member, so as to melt the part; and
    irradiating the glass layer with third laser light in a state where the second glass member is superposed on the first glass member having the glass layer fixed thereto with the glass layer interposed therebetween, so as to fuse the first and second glass members to each other.

2. A glass fusing method according to claim 1, wherein the one portion of the glass layer has a thickness greater than that of the main portion of the glass layer.

3. A glass fusing method according to claim 1, wherein the one portion of the glass layer has a width greater than that of the main portion of the glass layer.

4. A glass fusing method according to claim 1, wherein the part employed as the start and end points is molten by irradiation with the third laser light used as the second laser light while being pressed toward the first glass member by the second glass member superposed on the first glass member having the glass layer fixed thereto with the glass layer interposed therebetween, and then the glass layer is irradiated with the third laser light, so as to fuse the first and second glass members to each other.

5. A glass fusing method according to claim 1, wherein the part employed as the start and end points is irradiated with the second laser light while being included in an irradiation region.

6. A glass layer fixing method for manufacturing a glass-layer-fixed member by fixing a glass layer to a first glass member, the method comprising the steps of:
    arranging a glass layer containing a laser-light-absorbing material and a glass powder on the first glass member along a region to be fused extending like a closed ring so that a one portion of the glass layer has a volume per unit length greater than that of a main portion of the glass layer excluding the one portion; and
    irradiating the glass layer with first laser light while relatively moving an irradiation region of the first laser light along the region to be fused and employing the one portion or one or the other end of the main portion connected to the one portion as start and end points, so as to melt the glass layer, thereby fixing the glass layer to the first glass member.

\* \* \* \* \*